Figure 1:
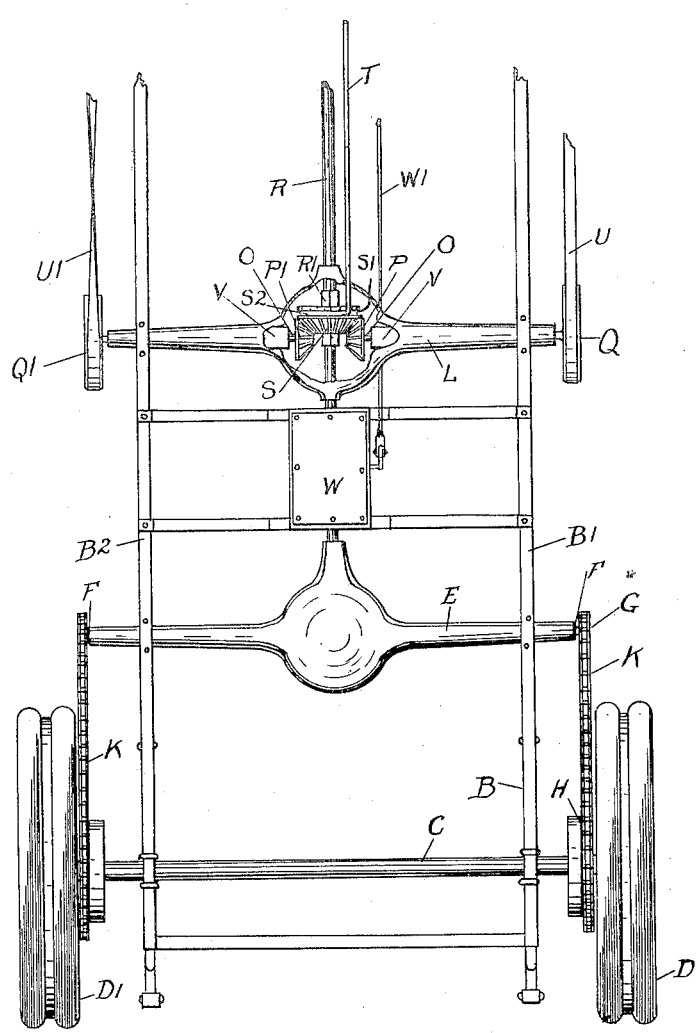

C. C. JACOBE.
ACCESSORY FOR TRANSMITTING POWER FROM TRUCK ENGINES.
APPLICATION FILED JULY 14, 1919.

INVENTOR
Charles C. Jacobe
BY
Francis C. Huebner,
ATTORNEY

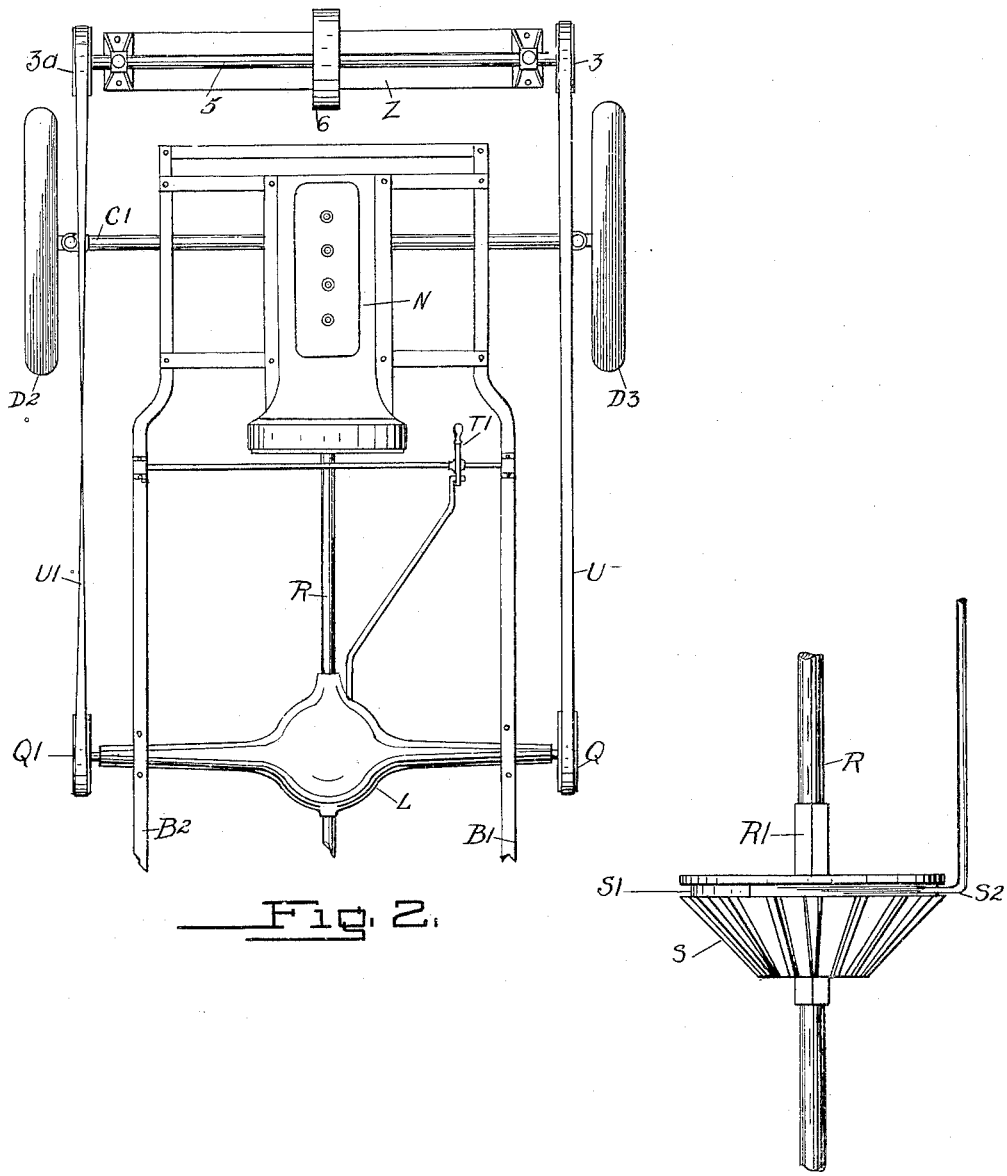

UNITED STATES PATENT OFFICE.

CHARLES C. JACOBE, OF RIVERDALE, CALIFORNIA.

ACCESSORY FOR TRANSMITTING POWER FROM TRUCK-ENGINES.

1,358,212.   Specification of Letters Patent.   Patented Nov. 9, 1920.

Application filed July 14, 1919. Serial No. 310,677.

*To all whom it may concern:*

Be it known that I, CHARLES C. JACOBE, a citizen of the United States, and resident of Riverdale, in the county of Fresno and the State of California, have invented a new and useful Improvement in Accessories for Transmitting Power from Truck-Engines, of which the following is a specification.

My invention relates to an attachment for trucks, and more particularly to a device whereby the power plant on the truck can be used for driving stationary machinery at will, as for instance, a threshing machine, wood saw, or similar device, and at the same time the power can be readily shifted so that the truck can be used in its normal manner. The special object is to have an attachment for a truck which can readily be thrown in gear so that it can readily be used for trucking purposes, and when it is desired the attachment I have invented can be thrown in gear so that the power plant will operate other machines.

I have accomplished these, and other objects which will hereinafter appear by means of the device described on the inclosed drawings which are hereby made a part of this specification, in which Figure 1 is a top plan view of the rear part of the chassis of a truck, showing my invention attached thereto. Fig. 2 is a top plan view of the front end of the chassis of a truck showing my invention, and Fig. 3 is a view of a detailed portion of the gear shifting device.

In said drawing B represents the frame of the truck, having the parallel beams $B^1$ and $B^2$. C is the rear axle, and supports drive wheels D and $D^1$. $C^1$ is the front axle and supports wheels $D^2$ and $D^3$. E is the differential housing of the truck, covering any of the usual forms of differentials used on trucks, which drives duplicate shafts F which terminate at each end with a gear G. H is a gear attached to each of the drive wheels D and $D^1$, and K is a chain adapted to transmit power from the driving gear G to the wheels D and $D^1$. R is a driving shaft extending from the engine or power plant to the differential inclosed in the housing E. L is an auxiliary housing attached to frame B approximately parallel with the rear housing E, and between the power plant N and the rear axle housing. O and $O^1$ are shafts within the housing L, and carried in bearings V and $V^1$ which hold them on a common center line a spaced distance apart. At the ends of the shafts O and $O^1$ which are nearest together, I have attached beveled gears P and $P^1$, and at the opposite ends have attached pulleys Q and $Q^1$. R is the drive shaft extending from the engine N to an ordinary differential hereinbefore referred to, within the rear axle housing E. In assembling this device the housing L is adjusted so that the drive shaft R will pass transversely through the approximate center of the housing L, and through the space midway between the ends of the shafts O and $O^1$. The portion of the drive shaft indicated as $R^1$, which passes through the housing L, is formed square as shown on the drawings, but can be constructed in any suitable shape for the purposes hereinafter disclosed. S is a driving gear constructed to slide on the square portion $R^1$ of the driving shaft, and so that it will rotate with the shaft. Driving gear S is adapted to mesh with beveled gears P and $P^1$ and to be engaged with them at will. When thus engaged the power from the power plant will turn the axles O and $O^1$, and with them rotate pulleys Q and $Q^1$. Gear S is constructed with a peripheral groove $S^1$ into which a release collar, or yoke $S^2$ is fitted so that the gear will rotate therein. T is a rod attached to yoke or collar $S^2$ at one end, and to a lever $T^1$ at the other end, so that by the operation of lever $T^1$ the gear S can be thrown in gear or out of gear with said beveled gears P and $P^1$, the purpose being that when the device is to be used as a truck, the pulleys Q and $Q^1$ will not be rotating, and when it is desired to transmit power through pulleys Q and $Q^1$, it can be done.

W is a housing covering the ordinary form of transmission gears for a truck. $W^1$ is the rod by which the transmission gears are operable.

Z is a device for transferring the power from the pulleys Q and $Q^1$ onto a shaft, or to one pulley, and consists of the following mechanical elements: 5 is a main shaft having a center pulley 6, and on each side thereof a pulley 3 and $3^a$ which are on line with pulleys Q and $Q^1$. The pulleys Q and 3 are connected with a straight belt U and pulleys $Q^1$ and $3^a$ are connected with a crossed belt $U^1$. This is necessary because with the construction noted the pulleys Q and $Q^1$ will rotate in opposite directions. The device Z can be dispensed with in actual use, and one of the pulleys Q or Q¹ can be allowed to run idle, or each of the pulleys Q and Q¹ can transmit power to different machines, or to different parts of the same machine. The applicant has made use of it in this latter form by driving the cylinder of a threshing machine with one pulley, and the other portions of the machinery of the same thresher with the other pulley.

I claim as new, and ask for Letters Patent upon:

1. In combination with a truck having a power plant, driving wheels, and a driving shaft adapted to transmit power from the power plant to the driving wheels, said driving shaft being formed with a squared portion between the ends thereof, a driving gear slidably fitted on said squared portion of the driving shaft, two shafts journaled so that they have a common center line, gears attached at one end of each of said shafts adapted to mesh with the driving gear, and means for sliding the driving gear so that it will disengage with said shaft gears, and pulleys on the ends of the shafts opposite to the gears, substantially as described, and for the purposes set forth.

2. In combination with a truck having a power plant, driving wheels, and a driving shaft adapted to transmit power from the power plant to the driving wheels, a driving gear adapted to slide on a portion of the driving shaft between the ends thereof, means for keeping said driving gear from rotating on said shaft, two driven shafts journaled so they have a common center line at approximately right angles to the driving shaft, each of said driven shafts having gears of uniform size adapted to engage and disengage contemporaneously with the sliding driving gear, pulleys attached to the driven shafts, an auxiliary shaft journaled parallel to the driven shafts, pulleys on the auxiliary shaft in line with the pulleys on the driven shafts, belt means for transmitting power from the driven shaft pulleys to the pulleys on the auxiliary shaft, one of said belts running straight, and the other crossed, a main pulley on the auxiliary shaft between the ends thereof, all substantially as described and for the purposes set forth.

CHARLES C. JACOBE.

Witnesses:
J. F. REYNOLDS,
ALPHA JACOBE.